(12) United States Patent
Moser et al.

(10) Patent No.: US 8,573,609 B1
(45) Date of Patent: Nov. 5, 2013

(54) TENT LEG WEIGHT ASSEMBLY (75) Inventors: Cindy S. Moser, Runnells, IA (US);
Clarence H. Rail, Ankeny, IA (US);
Clyde T. Rail, Ankeny, IA (US)

(73) Assignee: Cindy S. Gordon, Runnells, IA (US)

( * ) Notice: Subject to any disclaimer, the term of this patent is extended or adjusted under 35 U.S.C. 154(b) by 0 days.

(21) Appl. No.: 13/355,157

(22) Filed: Jan. 20, 2012

Related U.S. Application Data (60) Provisional application No. 61/435,164, filed on Jan. 21, 2011.

(51) Int. Cl.
*B62B 1/14* (2006.01)
*E04H 15/62* (2006.01)
*B65D 21/02* (2006.01)

(52) U.S. Cl.
USPC .................. 280/47.27; 280/47.23; 280/47.26; 248/346.03; 248/508; 248/519; 135/118; 211/59.1; 206/499

(58) Field of Classification Search
USPC ........ 280/47.131, 47.17, 47.23, 47.24, 47.26, 280/47.27; 135/118; 248/346.01, 346.03, 248/346.05, 508, 511, 519, 539; 211/49.1, 211/54.1, 57.1, 59.1; 206/499
See application file for complete search history.

(56) References Cited

U.S. PATENT DOCUMENTS

| | | | | |
|---|---|---|---|---|
| 394,442 A * | 12/1888 | Berger | ........................ | 280/47.27 |
| 2,187,355 A * | 1/1940 | MacManus | .................. | 211/49.1 |
| 2,510,676 A * | 6/1950 | Biek | .............................. | 414/450 |
| D161,105 S * | 12/1950 | Haworth | ........................ | D34/24 |
| 2,670,853 A * | 3/1954 | Schneider | .................... | 211/49.1 |
| 2,711,330 A * | 6/1955 | Frye | ........................... | 280/47.26 |
| 3,079,168 A * | 2/1963 | Monroe et al. | ............. | 280/47.28 |
| 4,248,453 A * | 2/1981 | Stark | ............................. | 280/655 |
| 4,424,905 A * | 1/1984 | Keen | ............................ | 211/49.1 |
| 5,094,422 A * | 3/1992 | Tiffany | ......................... | 248/519 |
| 5,248,157 A * | 9/1993 | Rice | .......................... | 280/47.131 |
| 5,253,790 A * | 10/1993 | Brady | ........................ | 223/109 R |
| 6,312,208 B1 * | 11/2001 | Crowley et al. | ............... | 414/398 |
| 6,848,586 B1 * | 2/2005 | Guliner | ........................ | 211/49.1 |
| 6,923,457 B2 * | 8/2005 | Nogaki | ........................ | 280/47.27 |
| 6,981,680 B1 * | 1/2006 | Gordon et al. | ........... | 248/346.01 |
| 7,651,104 B1 * | 1/2010 | Hilt | ........................... | 280/47.131 |
| 7,914,424 B1 * | 3/2011 | Krull | ............................. | 482/104 |
| 2004/0056438 A1 * | 3/2004 | Hailston | .................... | 280/47.27 |
| 2005/0199774 A1 * | 9/2005 | Reese | ........................... | 248/529 |
| 2010/0068026 A1 * | 3/2010 | Brewer et al. | .............. | 414/749.6 |
| 2011/0180679 A1 * | 7/2011 | Ma | ............................. | 248/346.01 |
| 2012/0090925 A1 * | 4/2012 | White et al. | .................... | 188/32 |

* cited by examiner

*Primary Examiner* — John R Olszewski
(74) *Attorney, Agent, or Firm* — McKee, Voorhees & Sease, P.L.C.

(57) ABSTRACT

A plurality of tent weight plates are adapted to be stacked one upon another in use on a tent leg and in transport on a cart. A base plate on the lower-most weight plate includes an extension beyond the plates to which a tent leg is secured. The weight plates include a tab matingly received in a track between rails on the cart to prevent shifting of the plates on the cart. The plates also include holes which are aligned when the plates are stacked so as to receive a post through the holes to maintain alignment of the stacked plates in use on the tent leg and during transport on the cart.

4 Claims, 9 Drawing Sheets

TENT LEG WEIGHT ASSEMBLY

CROSS-REFERENCE TO RELATED APPLICATIONS

This application claims priority under 35 U.S.C. §119 to provisional application Ser. No. 61/435,164 filed Jan. 21, 2011, herein incorporated by reference in its entirety.

BACKGROUND OF THE INVENTION

Applicant's U.S. Pat. No. 6,981,680 describes flat weight plates for use on legs of tents to stabilize the tents. It is often necessary to use multiple weight plates on each leg when the tent is set up outdoors due to the wind, to assure that the tent does not blow over. In a preferred embodiment, each weight plate weighs approximately 32 pounds. Thus, a total weight for each tent or stand may range from a minimum of approximately 128 pounds with one plate per leg, to hundreds of pounds, when multiple plates are used on each leg. Often, the tent and the leg weight plates are manually carried from a transport vehicle to a distant set-up site, which may not be accessible by a vehicle. In such a situation, getting the weights to and from the set-up site becomes a laborious job.

Therefore, a primary objective of the present invention is the provision of an easier way to move the tent leg weights between the vehicle and the tent set-up site.

A further objective of the present invention is the provision of a specially designed cart to move stacks of tent leg weights quickly, easily, and safely from one location to another.

Another objective of the present invention is the provision of a guide bar or post to maintain stacked weight plates in alignment during use and transport.

Still another objective of the present invention is the provision of a transport dolly for hauling a plurality of tent leg weight plates with little, if any, risk of the plates falling from the dolly during transport.

Yet another objective of the present invention is the provision of tent leg weight plates which can be stacked with aligned openings to receive a bar to maintain alignment of the plates without shifting of the plates relative to one another.

A further objective of the present invention is the provision of a tent leg weight cart which is economical to manufacture, durable in use, and which maintains the plates adjacent to one another when the cart is upright in a vertical orientation and laid down in a horizontal orientation.

These and other objectives will become apparent from the following description of the invention.

SUMMARY OF THE INVENTION

The present invention is directed towards a dolly or cart for transporting tent leg weight plates, such as those shown in FIGS. 2 and 3 of Applicant's U.S. Pat. No. 6,981,680. One end of the plates is received between the cart rails to retain the plates in position on the cart, whether the cart is upright, laid down, or tilted between the vertical and horizontal positions. The second aspect of the invention is the provision of an alignment bar or post which is installed through openings adjacent the handles of the weight plates to maintain alignment of the plates relative to one another, both during use and during transport of the plates. The alignment bar or post may be hooked to the first or bottom plate, with subsequent plates stacked over the top of the post. Alternatively, the weight plates can be stacked with the openings aligned, and then the bar or post is inserted through the openings.

DETAILED DESCRIPTION OF THE PREFERRED EMBODIMENTS

The tent leg weight assembly 10 of the present invention generally is directed towards a series of tent weight plates 12 which are stacked one upon the other, and to which a tent leg 14 is connected so as to quickly and easily set up and maintain the tent 16 on a support surface, such as the ground, a floor, or other hard surface without the use of stakes, sand or water.

Figure 1:
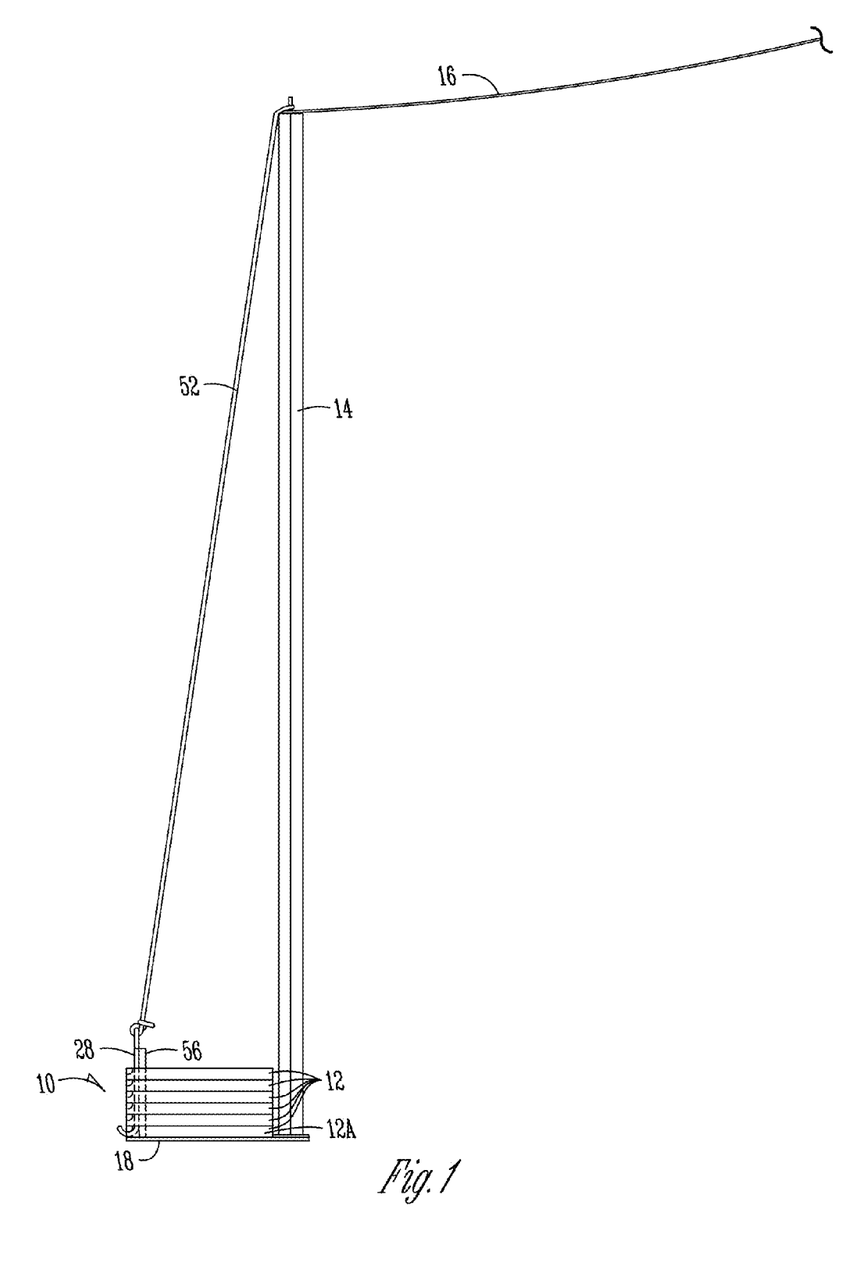
FIG. 1 is a side elevation view of the tent leg weight plates in use, with a tent leg secured thereto and a tie down rope extending between the tent and the weight plates.
Figure 2:
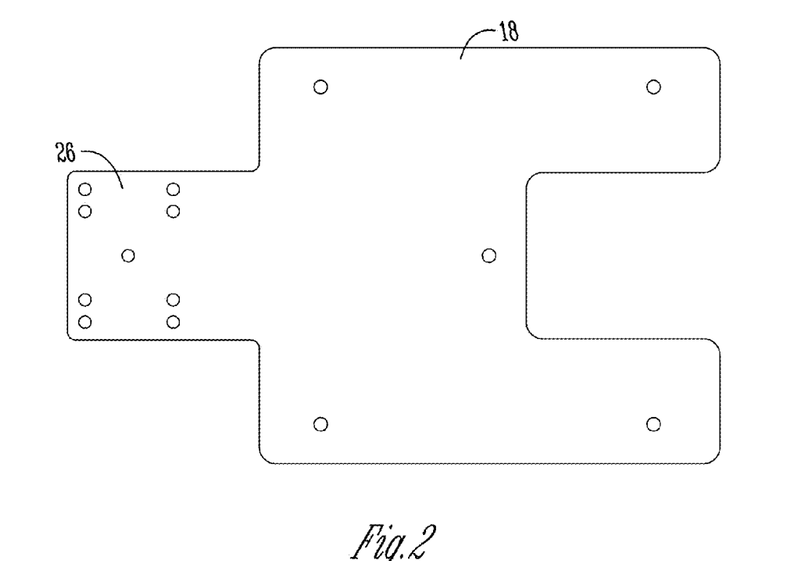
FIG. 2 is a top plan view of the base plate used in the weight plate assembly of the present invention.
Figure 3:
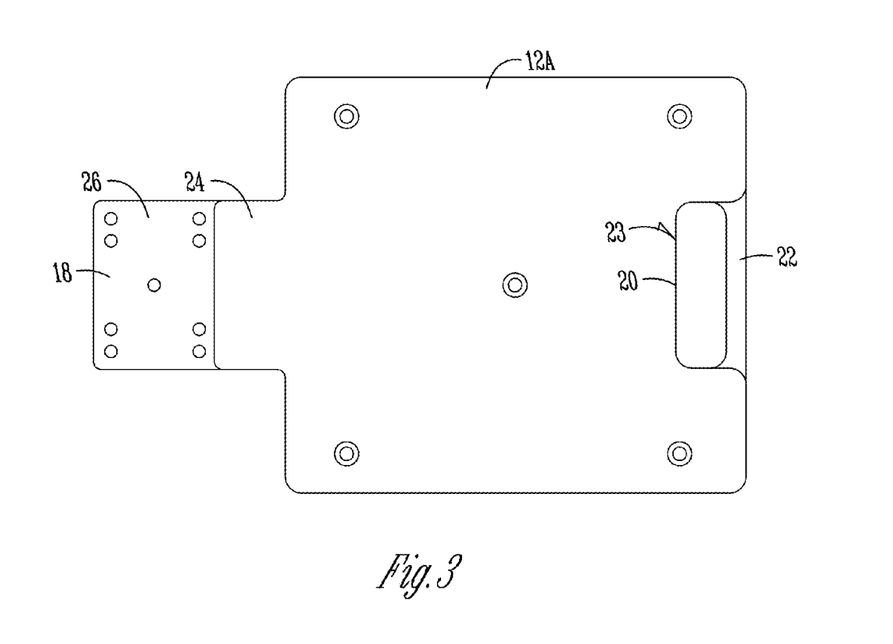
FIG. 3 is a top plan view of the assembled base plate and first leg weight plate of the present invention.

According to the present invention, the assembly 10 includes a base plate 18, which is secured to the bottom of the first or lower-most tent weight plate 12A in any convenient manner, such as bolts or other fasteners. The tent weight plates 12 are identical in shape, and in a preferred embodiment have the configuration similar to that shown in Applicant's U.S. Pat. No. 6,981,680, FIGS. 2 and 3. Preferably, each weight plate 12 has a recess 20 along one edge with the handle 22 extending across the recess 20 so as to form an opening 23, as best seen in FIG. 3. Each plate 12 has an extension or tab 24 extending outwardly from the edge opposite the handle 22. The plates 12 are flat on the upper and lower surfaces so as to be readily stacked. As further seen in FIG. 3, the base plate 18 includes an extension 26 residing beyond the lower weight plate 12A, and to which one tent leg or post 14 can be secured. The tent leg 14 can be secured to the base plate extension 26 using bolts or other convenient fasteners, as described in Applicant's U.S. Pat. No. 6,981,680.

Figure 4:
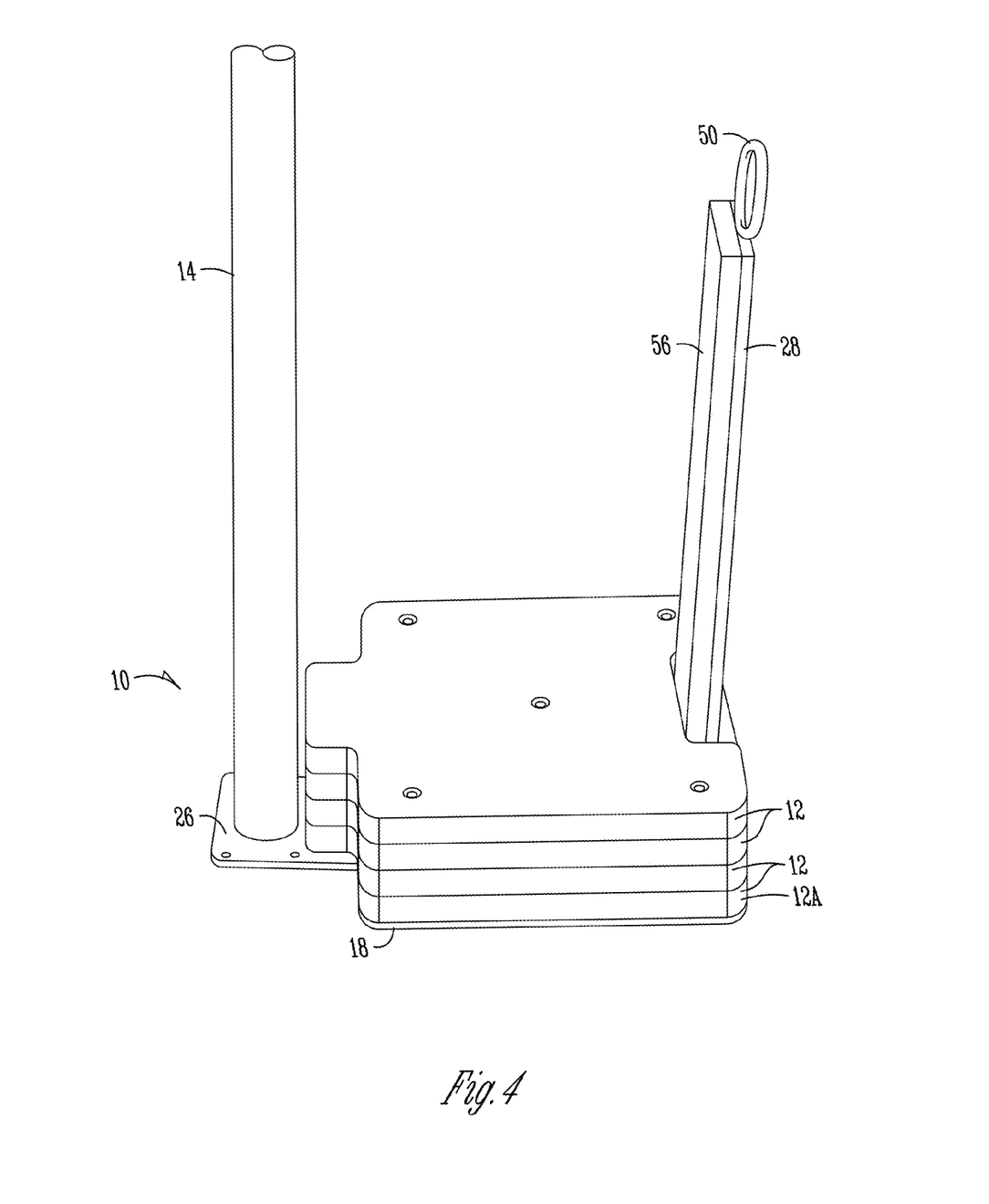
FIG. 4 is a perspective view of a series of weight plates stacked on the base plate, with the guide post inserted through the weight plates, in accordance with the present invention.

The tent leg weight assembly 10 of the present invention further includes a guide bar or post 28 which extends through the openings 21 of the stacked weight plates 12 so as to keep the plates 12 aligned, without the use of pins, bolts, screws, or other fasteners. More particularly, the bar 28, preferably has a hook 30 on the lower end. The hook 30 receives the handle 22 of the first or lower weight plate 12A, as seen in FIG. 3. Additional weight plates 12 can be stacked over the guide bar 28, with the guide bar 28 extending through the opening 23 of each weight plate 12 defined by the recess 20 and the handle 22, as best seen in FIG. 4. Thus, multiple weight plates 12 can be set in position over the guide bar 28 to provide the necessary and sufficient stabilizing weight for each tent leg 14. Alternatively, the weight plates 12 can be stacked first and then the guide bar 28 inserted downwardly through the aligned holes 23 in the weight plates 12. The hook 30 on the guide bar 28 may be permanently secured to the end of the bar, such as by welding, or removably mounted, such as by bolts or a pin. It is understood that preferably there is one guide bar 28 for use with the plates 12 at each tent leg 14.

Figure 5:
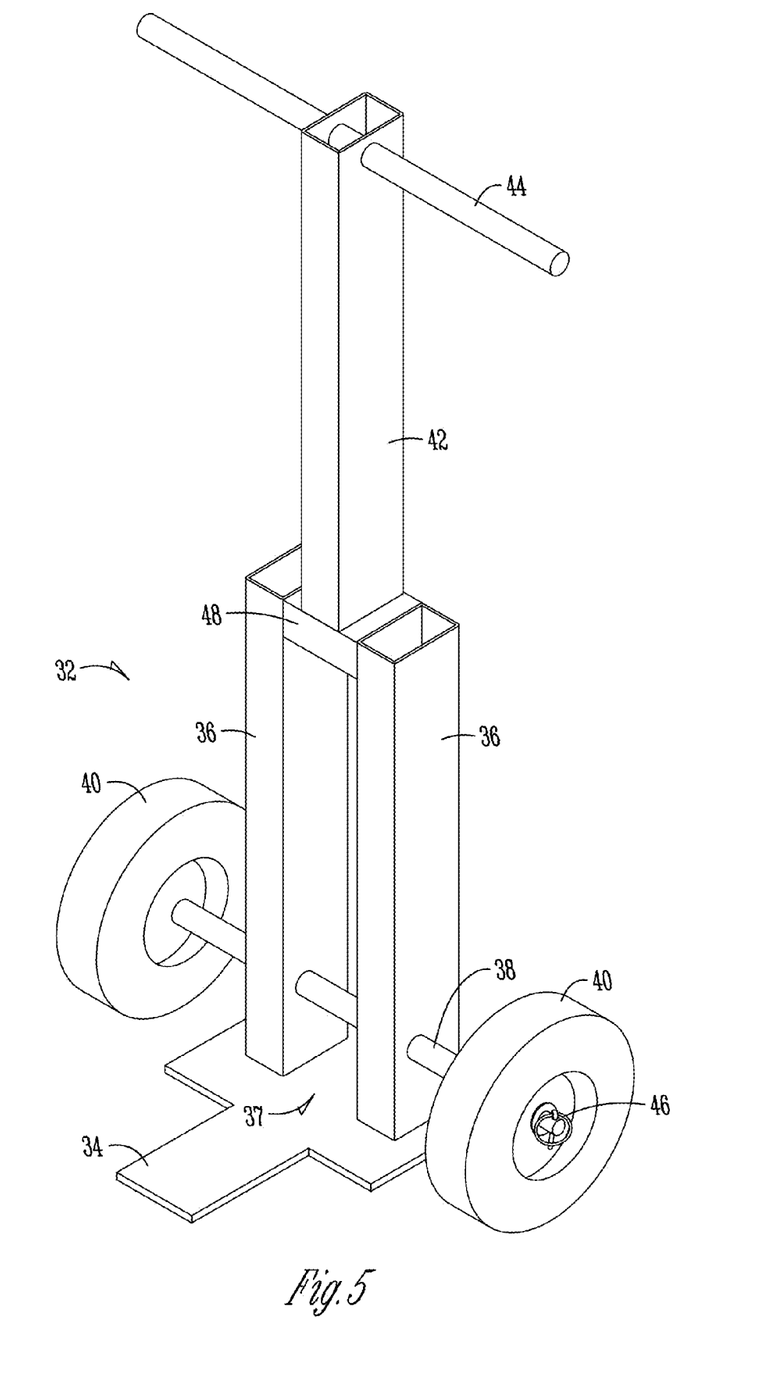
FIG. 5 is a front perspective view of one embodiment of the cart for hauling the weight plates according to the present invention.
Figure 6:
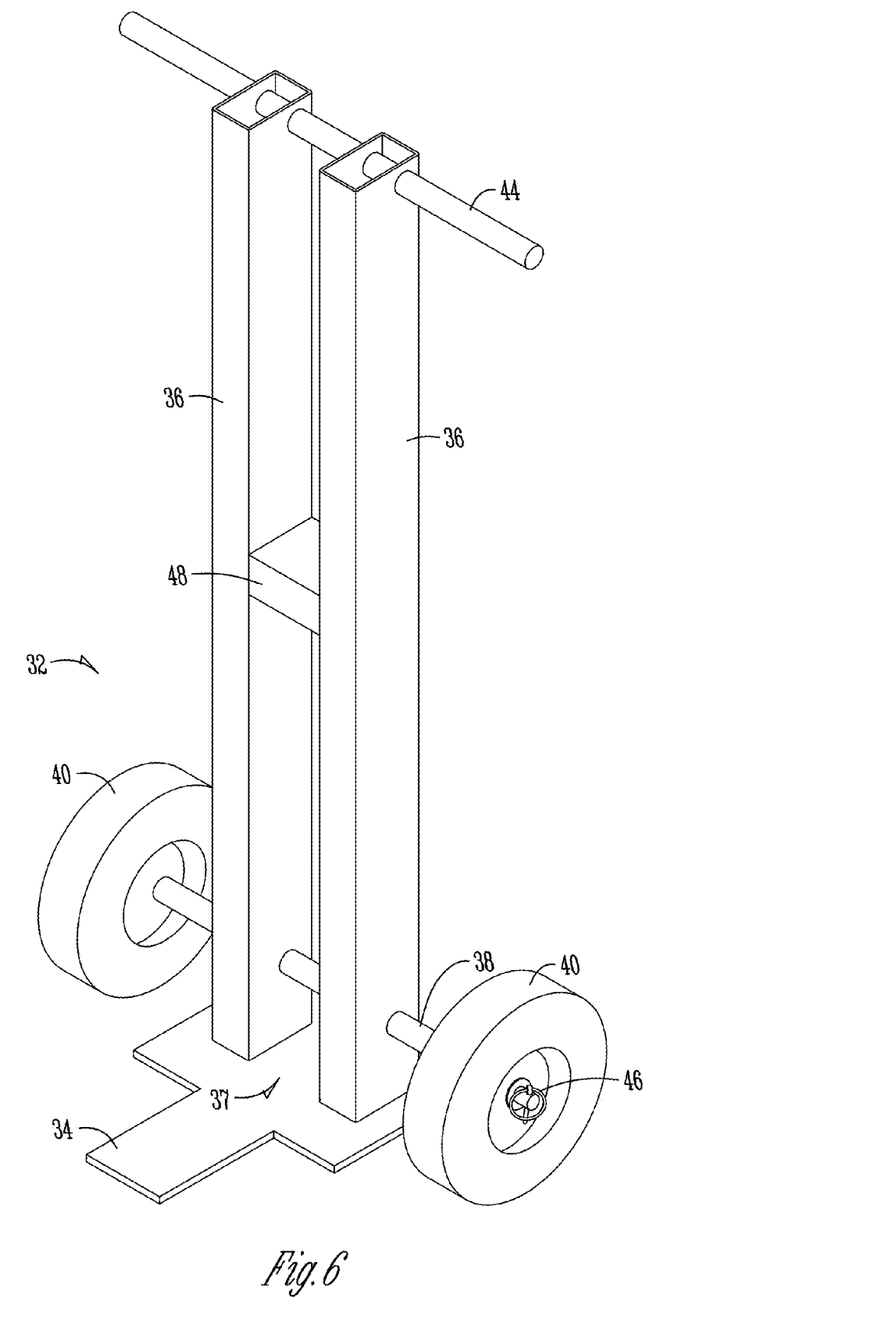
FIG. 6 is a front perspective view of an alternative embodiment of the cart for hauling the weight plates, in accordance with the present invention.
Figure 7:
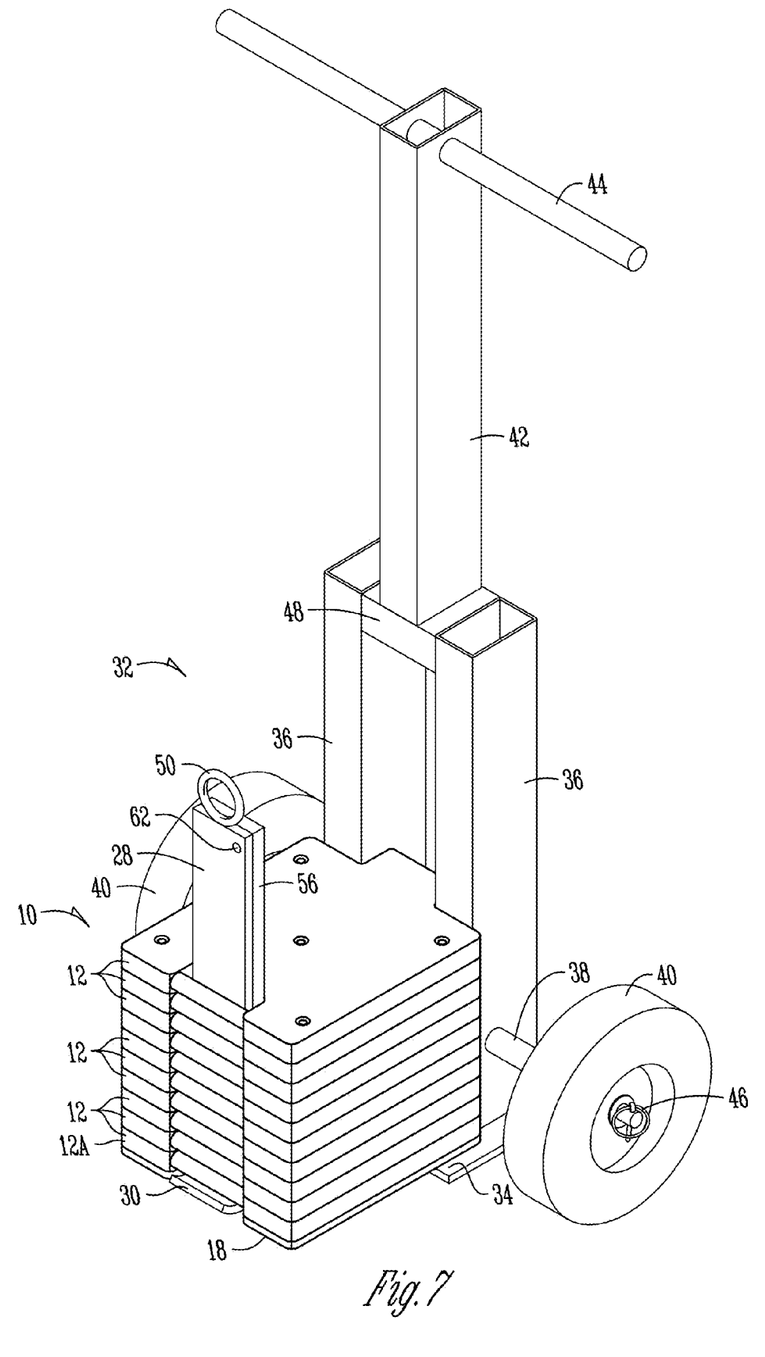
FIG. 7 is a perspective view of the cart of FIG. 5 loaded with stacked weight plates, with the cart in an upright resting position.
Figure 8:
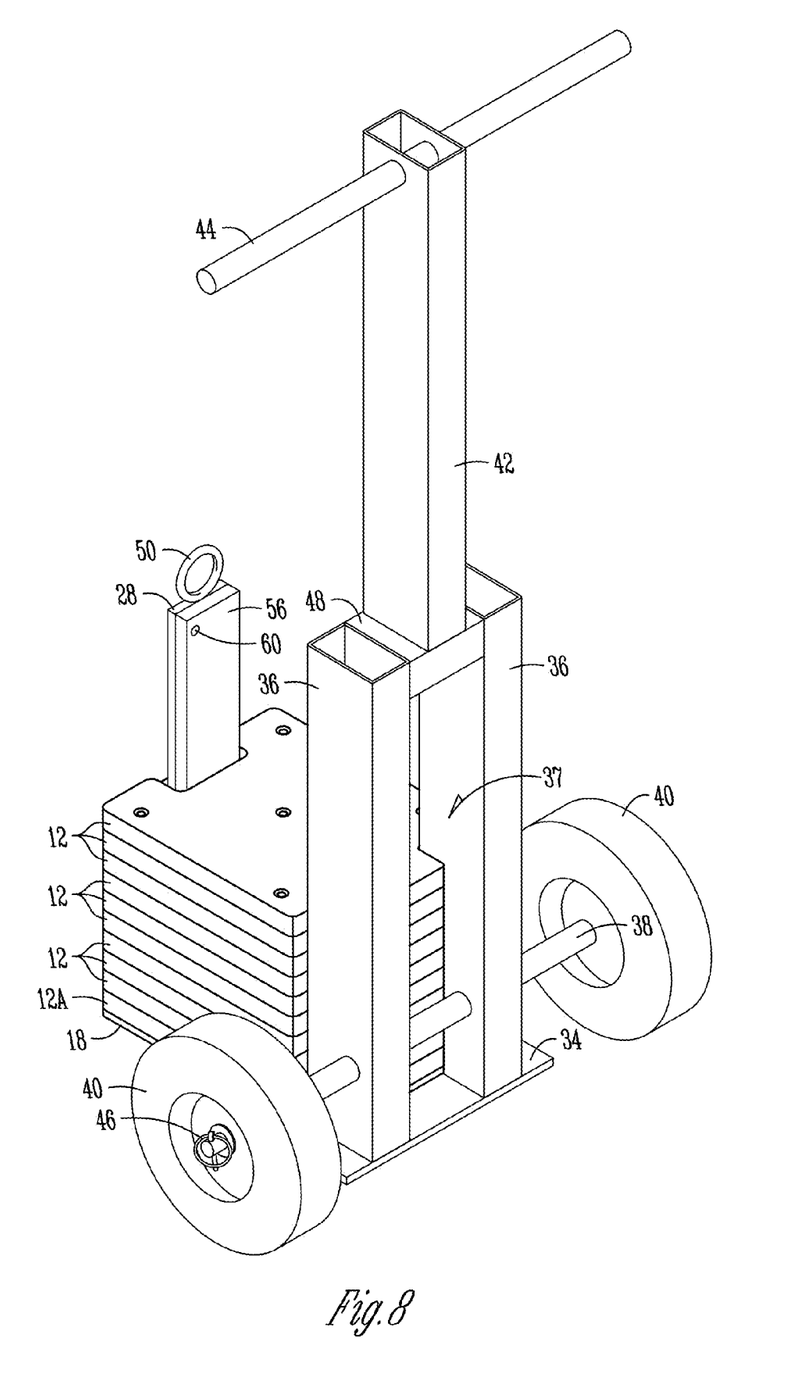
FIG. 8 is a rear perspective view of the cart with weight plates in accordance with the present invention.

The present invention further includes a cart 32 for transporting stacks of weight plates 12, as seen in FIGS. 5-9. The cart or dolly 32 includes a base or foot 34, with a pair of spaced apart legs or rails 36 extending upwardly from the foot 34. An axle 38 extends through the legs 36 with wheels 40 on opposite ends of the axle 38. The legs 34 can extend the full height of the cart 32, as seen in FIG. 5, or in the alternative embodiment shown in FIG. 6, the legs 36 can extend approximately one-half the full height, with a third, single leg 42 extending for the upper half of the cart 32. A handle 44 is provided at the top of the legs 36 or leg 42 for gripping by an operator. The wheels 40 can be mounted on the cart axle 38 with a removable pin 46, so that the wheels 40 can be quickly and easily removed or disassembled from the axle 38. A cross brace 48 extends across the tops of the cart legs 36. Alternatively, the cross brace 48 can be positioned between the legs 36, as in FIG. 5.

Preferably, the legs 36 are hollow to allow storage for tools, hardware, and even the guide posts 28, such that this equipment can be inserted into the cart legs 36 when not in use with the weight plates 12. A cap can be provided on the top of the legs 36 to close the upper end.

The tent weight plates 12 can be stacked upon the cart base 34, with the guide post extending therethrough to maintain the plates 12 in alignment while being transported on the cart 32. The plates 12 can be stacked before or after the guide post 28 is hooked to the bottom plate 12A. For example, in a first method, after the assembly base plate 18 with attached first weight plate 12A is positioned on the base 34 of the cart 32, the guide post 28 is inserted in the opening 23 of the plate 12A with the hook 30 engaging the handle 22 of the first weight plate 12A. Successive weights 12 can then be stacked on the cart 32 over the guide post 28. In a second method, all the weight plates 12 are stacked on the cart foot 34, and then the guide post 28 is inserted downwardly through the plate holes 23 and hooked to the bottom plate 12A. As a third option, the stacked plates 12 with the bar 28 inserted can be tipped slightly, so as to raise an edge of the base plate 18 off the ground to allow the base 34 of the cart to be slid under the base plate 18, and thereby position the plates 12 on the cart 32. The tabs 24 of the weight plates 12 reside between the spaced apart rails or legs 36 of the cart 32, which further maintains the alignment of the weight plates 12 on the cart 32. The base plate 18 may have feet on the bottom, which will allow the dolly foot 34 to slide beneath the base plate 18.

In use, after the weight plates 12 are on the cart 32, a user can grip the cart handle 44 and tilt the cart 32 rearwardly so that the loaded cart can be wheeled to and from one location to another. The weight plates 12 can easily be unstacked from the cart 32, in the reverse order in which they were stacked.

The guide bar or post 28 maintains the alignment of the weight plates 12 both during use on a tent leg 14 and during transportation on the cart 32. Preferably, the guide bar 28 and weight plate holes 23 have complimentary shapes, sufficient clearance to allow the hook 30 to move through the openings 23, and with only slight clearance between the sides of the holes 23 and the guide bar 28 so as to preclude shifting of the plates 12. Thus, multiple weight plates 12 can be easily moved and used, as required by different tent set-ups and environmental conditions. The guide post 28 may include an upper ring 50, hole, cleat, or other structure to which a tie down line 52 from the tent 16 can be attached.

Figure 10:
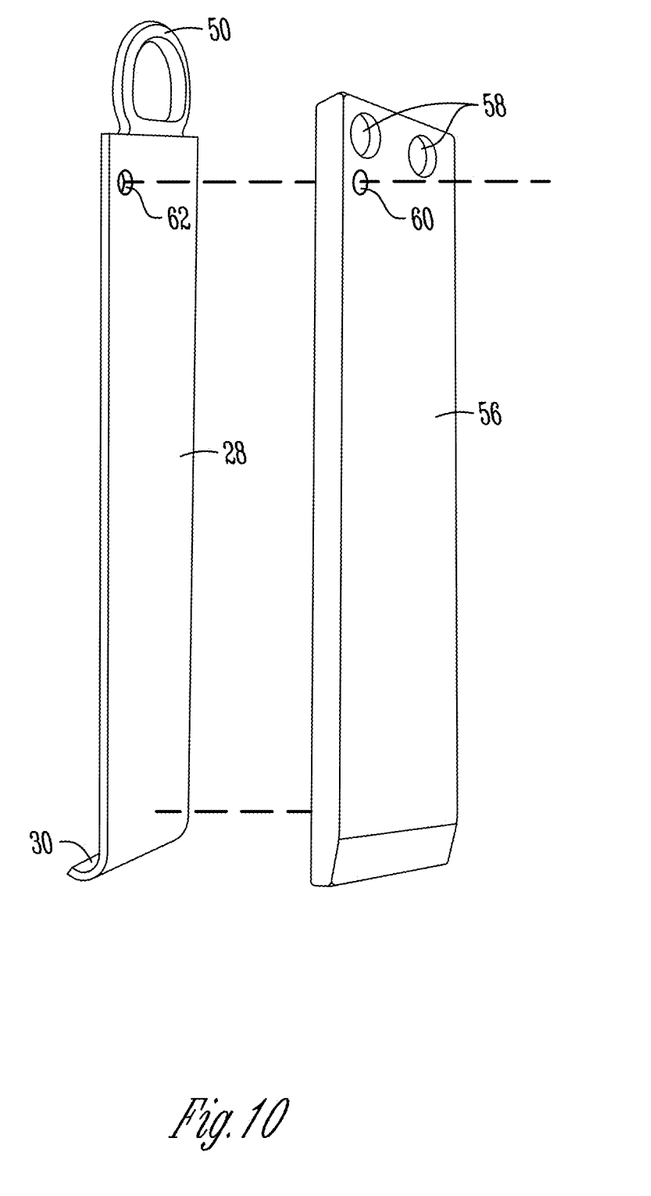
FIG. 10 is a perspective view of one embodiment of a guide bar and wedge combination according to the present invention.

FIG. 10 shows a preferred embodiment of the guide post 28, according to the present invention. More particularly, the guide post 28 is used in conjunction with an elongated wedge 56. The wedge 56 has a tapered lower end so that the wedge 56 can be placed behind the elongated post 28 and easily nested or inserted through the weight plate openings 23 adjacent the weight plate handles 22. The upper end of the wedge 56 has one or more recesses or notches 58 for a person to grip the upper end of the wedge 56 with their fingers or using a tool, and pull the wedge 56 upwardly and out of the weight plate openings 23 so that the bar 28 can be removed. Thus, the wedge 56 provides a tighter fit with bar 28 in the holes 23 and locks the bar 28 in position. As seen in FIG. 10, the bar 28 and the wedge 56 have aligned holes 60, 62, respectively, for receipt of a padlock, to preclude theft of the plates. It is understood that bar 28 can be used alone, without the wedge 56, in which case the thickness of the bar 28 can be increased.

Figure 9:
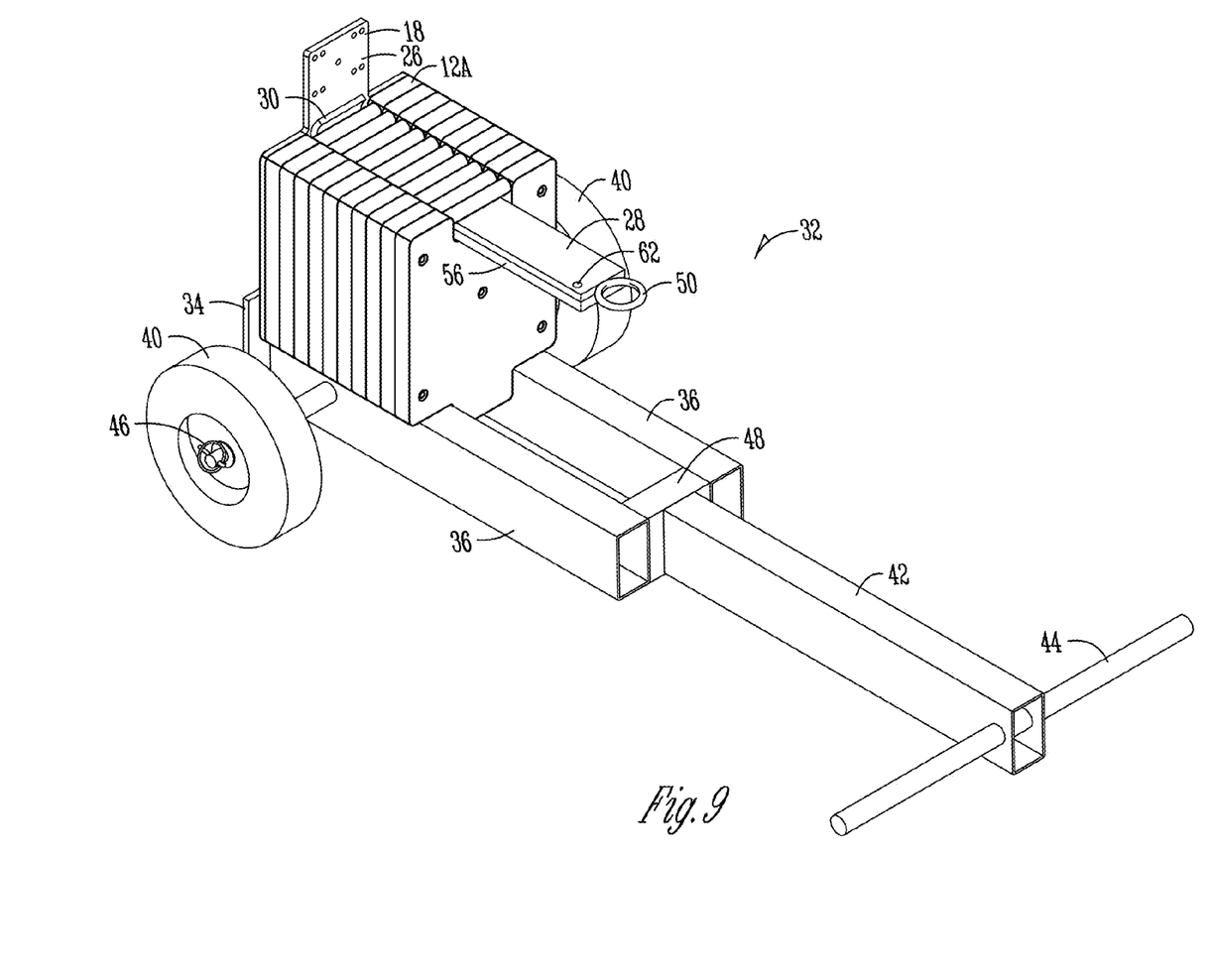
FIG. 9 is a view of the cart laid down in a horizontal position, with weight plates stacked thereon, in accordance with the present invention.

FIG. 9 shows the cart 32 stacked with weight plates 12 and laid downwardly, substantially horizontally, so that the cart handle 44 is near the floor or support surface. The guide post 28 inserted through the plate holes 23 and the guide track 37 formed between the legs 36 of the cart 32 for receiving the tabs 26 of the weight plates 12, maintain the weight plates 12 on the cart 32 without any substantial shifting and without the plates 12 falling off the cart 32. The guide post 28 and guide track 37 provide enhanced safety, since the weight plates 12 will not fall off the cart 32, whether the cart is upright, inclined, or laid down.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. In combination, a cart, a post, and a plurality of tent weight plates each having a tab on one edge and an opening adjacent an opposite edge, comprising:
   a foot on the cart to support a stack of the plates;
   a pair of spaced apart rails each having a lower end connected to the foot and an upper end;
   wheels connected to the lower end of rails;
   a handle connected to the upper end of the rails;
   the tabs being matingly received between the rails to prevent shifting of the stack;
   the post being removably insertable through the openings in the stacked plates to maintain alignment of the stack of plates on the cart;
   the openings being formed by a recess in each weight plate and a handle extending across the recess; and
   the post includes a hook to engage the handle of a lowermost weight plate.

2. The weight assembly of claim 1 wherein the openings and the post each have a rectangular profile to preclude turning of the weight plates on the post.

3. The weight assembly of claim 2 wherein the post resides in the plate openings when the plates are transported on the cart to prevent shifting of the plates relative to one another.

4. The weight assembly of claim 1 further comprising a wedge insertable into the openings provide a tight engagement between the post and plates.

* * * * *